United States Patent [19]
Sitbon et al.

[11] Patent Number: 5,568,487
[45] Date of Patent: Oct. 22, 1996

[54] PROCESS FOR AUTOMATIC CONVERSION FOR PORTING TELECOMMUNICATIONS APPLICATIONS FROM THE TCP/IP NETWORK TO THE OSI-CO NETWORK, AND MODULE USED IN THIS PROCESS

[75] Inventors: Gérard Sitbon, Vitry sur Seine; Jean-Francois Bassier, Sucy en Brie; Bernard Katrantzis, Vitry sur Seine, all of France

[73] Assignee: Bull, S.A., Louveciennes, France

[21] Appl. No.: 348,860

[22] Filed: Nov. 28, 1994

(Under 37 CFR 1.47)

[30] Foreign Application Priority Data

Nov. 30, 1993 [FR] France ................... 93 14288

[51] Int. Cl.$^6$ ................................. H04J 3/16
[52] U.S. Cl. ................. 370/94.1; 370/85.13; 370/74
[58] Field of Search ................... 370/94.1, 94.2, 370/94.3, 60, 60.1, 85.13, 79, 100.1, 110.1, 94.3, 80; 395/200, 600, 650, 400, 425, 325, 800, 200.01, 727, 728, 410, 427; 340/825.03

[56] References Cited

U.S. PATENT DOCUMENTS 5,021,949  6/1991  Morten et al. ................. 370/94.1
5,224,098  6/1993  Bird et al. ................... 370/110.1

OTHER PUBLICATIONS

Software Practice & Experience, vol. 21, No. 12, Dec. 1991, Chichester GB, pp. 1365–1380, XP276457 J. W. Atwood et al. "A Streams Based Communications Subsystem In Turing Plus For Protocol Development" entire document.

Computer Design, vol. 24, No. 14, 1985, Littleton Massachusetts US, pp. 46–49 H. J. Hindin "C Compilers Accomodate Architectures In Mainframe T Micro Range" entire document.

IEEE Software, vol.4, No. 4, 1987, Los Alamitos US pp. 34–42 Lenz et al. "Software Reuse Through Building Blocks".

*Primary Examiner*—Douglas W. Olms
*Assistant Examiner*—Dang Ton
*Attorney, Agent, or Firm*—Kerkam, Stowell, Kondracki & Clarke, P.C.; Edward J. Kondracki

[57] ABSTRACT

The invention relates to an address conversion process for porting a telecommunications application APP from the TCP/IP network to the OSI/CO network, and to an address conversion module used in this process. In a known manner, access to the networks is authorized by way of a "socket" interface (SOC) for the TCP/IP network, and an "XTI" interface for the OSI/CO network. In a notable manner, the "socket" interface calls (SC), like a plurality of system cells (SY), are in a first time period oriented, at the moment of the link editing phase prior to obtaining the executable, to a module (W) for automatic address conversion of the library type. This module (W) then performs the conversion of the addresses specific to the TCP/IP network into addresses of the OSI/CO network and enables the passage from the TCP/IP protocol to the OSI/CO protocol. After conversion, the calls are transmitted to the "XTI" interface and can be used directly in the OSI/CO network. Only the calls intended for the TCP/IP network are processed; all other calls (NT) are returned to the system.

7 Claims, 5 Drawing Sheets

PROCESS FOR AUTOMATIC CONVERSION FOR PORTING TELECOMMUNICATIONS APPLICATIONS FROM THE TCP/IP NETWORK TO THE OSI-CO NETWORK, AND MODULE USED IN THIS PROCESS

FIELD OF THE INVENTION

The present invention relates to a process of address conversion for porting telecommunications applications from the TCP/IP network to the OSI-CO network, access to these networks being authorized by way of what is known as a "socket" interface for the TCP/IP network, and a "XTI" interface for the OSI-CO network. It also relates to an address conversion module used in this process.

BACKGROUND INFORMATION

In general, although it is ancient, TCP/IP architecture (for transmission control protocol/Internet protocol) is widely used in a great number of heterogeneous types of equipment. IP is at level 3 of the OSI model and assures the interconnections of the networks, and TCP corresponds to level 4 of the OSI model and effectively offers a connection-oriented transport service. However, users of the TCP/IP network must upgrade to the OSI (open system interconnection) architecture, which allows the interconnection and possible interaction of heterogeneous systems with a view to achieving distributed applications. Nevertheless, rapid growth of the market for local area networks has led to major recovery on the part of TCP/IP protocols, sometimes to the detriment of OSI protocols. For these various reasons, these two types of networks must necessarily coexist, and in certain cases it is therefore useful to be able to take an application that runs in a TCP/IP network and make it run in an OSI/CO (connection-oriented) network. Until now, it is known that adopting an application from one environment to another, that is, from a TCP/IP network to an OSI/CO network, had the disadvantage of being an unwieldy operation to which a great amount of time had to be devoted, and hence is an operation that involves additional cost. In fact, for a standard TCP/IP application of the FTP (file transfer protocol), Telnet (virtual terminal management), RPC (remote procedure call) or DCE (distributed computing environment) type to be able to be run on OSI, the source code has to be taken up and updated or modified, then all the calls have to be run through in reverse order, the primitives have to be called, and then addressing has to be redone, and because such an operation was especially tedious and complicated, it was used little if at all.

SUMMARY OF THE INVENTION

The object of the present invention is to overcome the above disadvantage, and it proposes a process of address conversion for porting telecommunications applications from the TCP/IP network to the OSI/CO network that does not require modifying the source code, that makes the conversion automatically, and that consequently is not so tedious and is fast. To do so, the process of address conversion referred to at the outset is notable in that the "socket" interface calls, as well as a plurality of system calls of the "read", "write" and "close" type, are oriented in a first time period, at the moment of the link editing phase prior to obtaining the executable, toward an automatic address conversion module of the library type that performs the conversion of the addresses pertaining to the TCP/IP network into addresses of the OSI/CO network and enable the passage from the TCP/IP protocol to the OSI/CO protocol, then after conversion the calls are transmitted to the "XTI" interface so as to then be directly used in the OSI/CO network, where only the calls intended for the TCP/IP network are processed, and all other calls are returned to the system. Thus thanks to the invention, an application running in the TCP/IP environment can also be used in the OSI environment without intervening in or modifying the source code, which is an enormous advantage for users, who need not upgrade their skills. It suffices to add the address conversion module, which will be used up to the moment of the link editing phase (that is, the last stage in producing the executable), both on the "client" side and the "server" side, for the sake of symmetry in the protocols and addresses. Consequently, in a simple way and incorporating a library-type conversion module corresponding to a set of functions, which is low in cost, the user can run his application automatically in a different telecommunications environment.

Two major changes have been made. A first change involves the interface; the calls are rerouted, at the moment of the link editing phase, from the "socket" interface (communication point functions) to the "XTI" interface (X/OPEN transport interface) via the address conversion module which converts the addresses. The second change which is made simultaneously involves the protocol: passage from the TCP/IP protocol to the OSI/CO protocol. Only the "socket" interface calls, and the system calls ("read", "write", "close", etc.) intended for the TCP/IP network are converted and processed; the other calls are not converted and are returned to the system (an example being a call involving an order to read a file which is not in the TCP/IP network.

Once converted, the calls are used in the OSI environment by way of the "XTI" interface. Accordingly, the conversion module is a library whose various inputs receive the various calls that are to be converted and processed. More specifically, taking the "socket" function call as an example, this latter reserves a file descriptor and undergoes verification; if this call is indeed intended for the TCP/IP network, that is, if it corresponds to the predetermined mode (for example, the type SOCK_STREAM and family AF_INET), it is converted, and the connection to the OSI environment is achieved; if not, it is redirected to the standard library TCP.

BRIEF DESCRIPTION OF THE DRAWINGS

The following description in conjunction with the accompanying drawings, all given by way of non-limiting example, will provide good comprehension of how the invention can be achieved.

DESCRIPTION OF THE PREFERRED EMBODIMENTS

Figure 1:
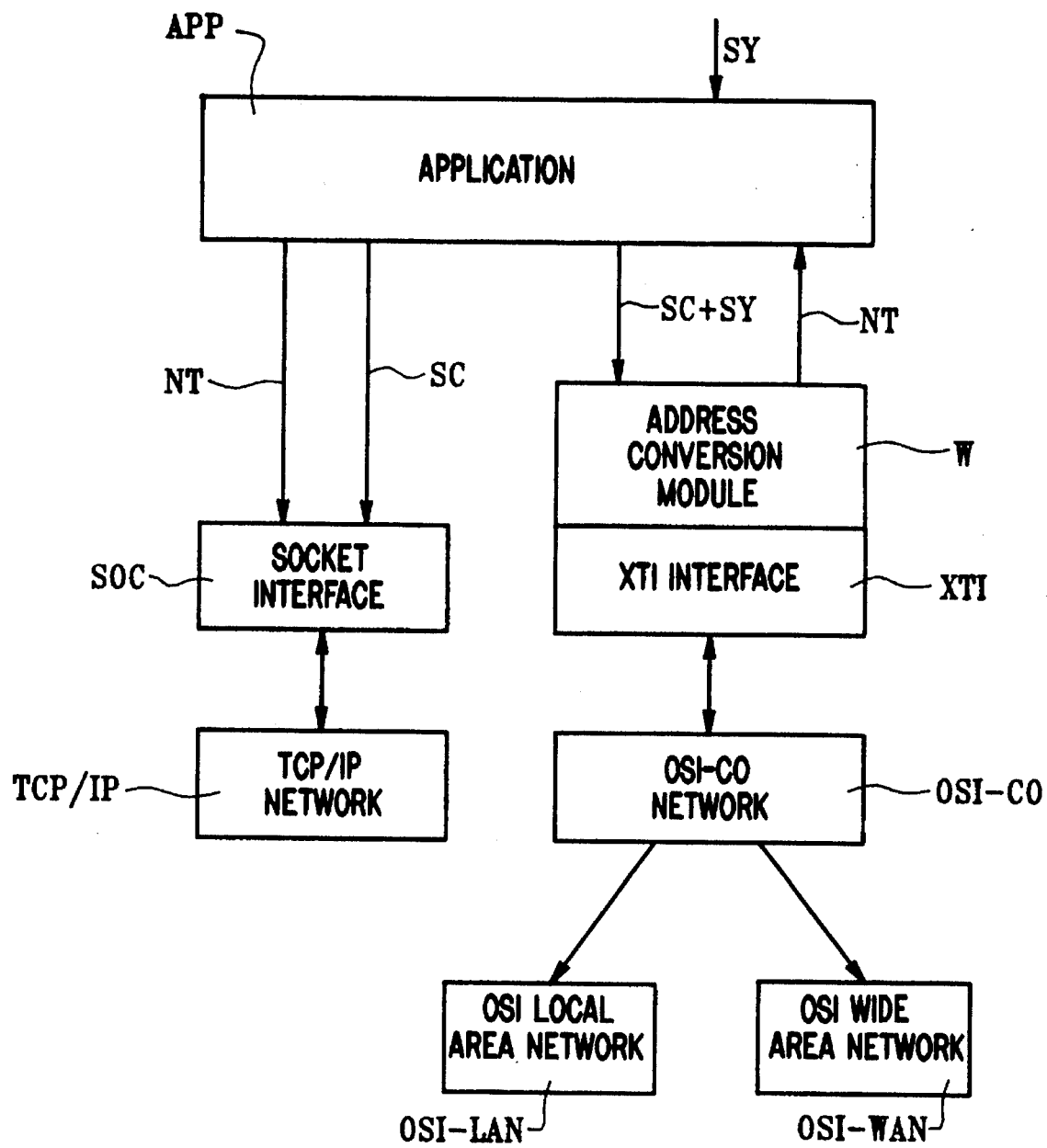
FIG. 1 schematically shows the address conversion module and its environment and the path taken by the "socket" interface calls and the system calls in question.

FIG. 1 shows address conversion wrapper W according to the invention in its environment. The wrapper W is a library which is constructed in the manner of an interface, whose first object is to receive the calls SC of the "socket" interface SOC and the system calls SY of the read, write, close, type etc., by way of the application APP of the TCP/IP, which calls manipulate file descriptors and are capable of manipulating a "socket" file descriptor. These various calls SC+SY are then rerouted to the wrapper W, at the moment of the link editing phase before the executable is obtained. The second object of the wrapper W is to automatically convert the addresses specific to the TCP/IP network into addresses of the OSI/CO network, and to enable the passage from the TCP/IP protocol to the OSI/CO protocol. After conversion, the calls SC+SY intended for the TCP/IP network are transmitted to the "XTI" interface so as to be used directly in the OSI/CO interface, which is the third object of the wrapper W. Any call NT that is not intended for the TCP/IP network, or in other words whose arguments are not specific to the "socket" interface, is returned to the system to the standard library TCP. The calls SC+SY received by the "XTI" interface are then transmitted to the stack of the OSI/CO network and then to the local area networks OSI-LAN (whose transmission system has a bus or loop architecture) or to the wide area networks OSI-WAN. The communications are always established for interconnected systems at the same level, with the transfer layers knowing the addresses of the various connections.

Accordingly, the wrapper W furnishes the means, for "connection oriented" applications functioning in a TCP/IP network, of functioning directly and automatically in an OSI/CO network. The wrapper W designed as a library furnishes syntax and semantics specific to "socket" interface calls, which are the same syntax and semantics necessary for managing communications between the "client" and "server" by the TCP/IP protocols, but used here in accordance with an OSI/CO protocol for access to an OSI/CO network.

In a notable and advantageous manner, when the "socket" interface call is intended for the TCP/IP network, that is, when it corresponds to a predetermined mode (SOCK_STREAM type and AF_INET family), a specific resource is created in memory for preserving the trace of the connection; the "XTI" interface is then called in order to this connection, and all of this is managed by means of a binary searching tree. In fact, when the number of calls is high, as is generally the case, it is difficult to retrieve the specific information for the connections of the wrapper W quickly if a chained list is used, and so a binary search tree is used to speed up the process. Briefly and under these conditions, the "socket" function call opens a file descriptor and then returns this file descriptor, and when this call is recognized as being intended for the TCP/IP network (recognition of the proper mode), at the moment the connection is opened, the parameters of the file descriptor that was returned to the "socket" interface are provided, and the search in the environment of this connection can be done by means of the binary searching tree based on this file descriptor, in order to arrive at the connection with the OSI/CO network having the OSI parameters. Further, with respect to the addressing (which is completely transparent to the application), it suffices for the system administrator, for instance, to generate an address conversion table in order to authorize conversion of the OSI addresses (NSAP: network service access point) into TCP/IP (Internet) addresses, and vice versa. Consequently, using a binary search tree makes it possible to optimize the searching by way of an ordered sequence structure based on information intended for the "socket" interface. Furthermore, the port ("socket") is transformed into a transport selector (TSEL) and vice versa.

Figure 2:
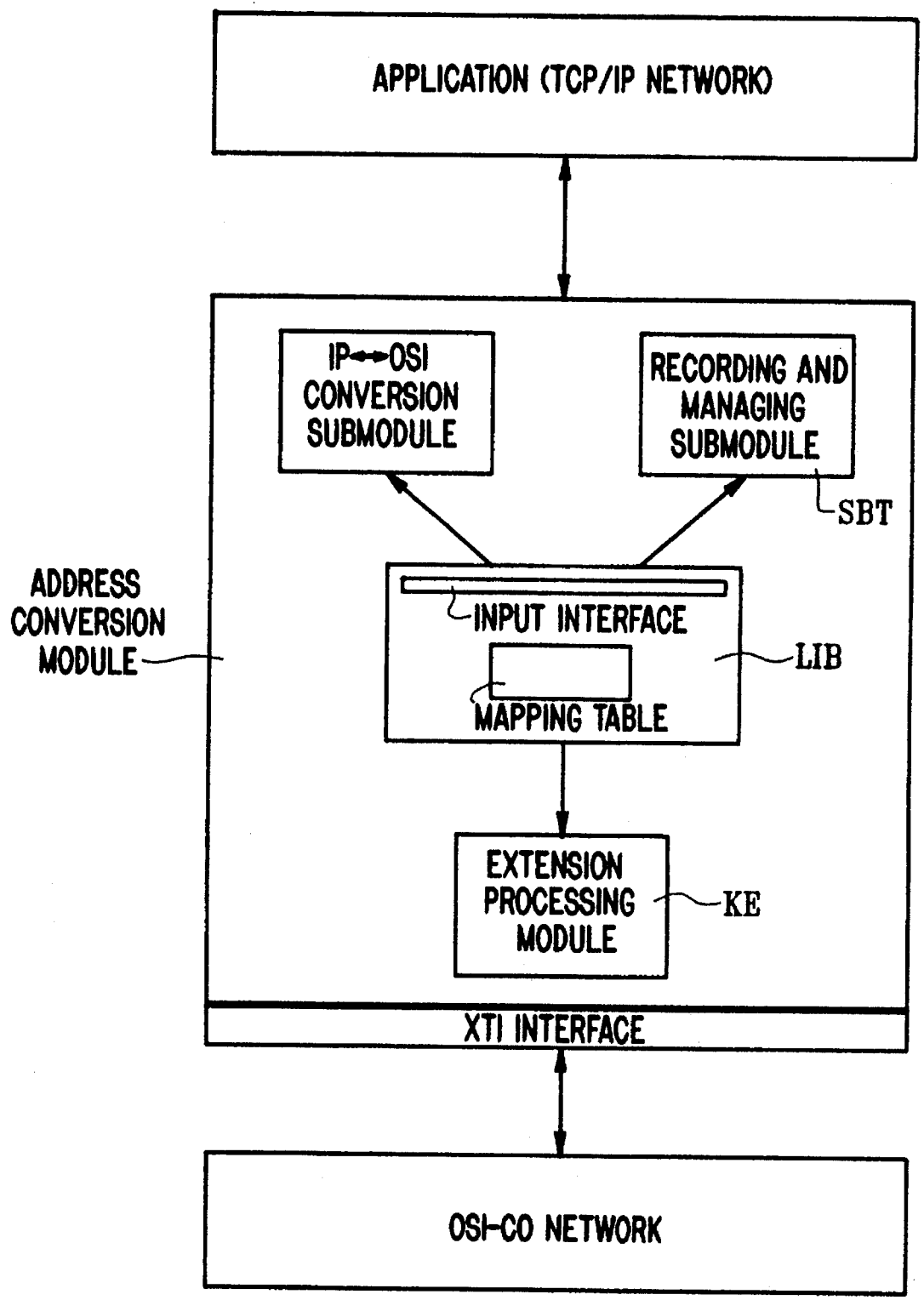
FIG. 2 proposes an exemplary embodiment of the address conversion module according to the invention.

FIG. 2 proposes an exemplary embodiment of the conversion wrapper W according to the invention.

The wrapper W is designed in the form of a library that assures the interface service between the application APP intended so that it can be used in a TCP/IP network and the OSI communications layers (OSI network) by way of the XTI interface, where the first communications layer accessed is the OSI transport layer, and the application APP can then be used in a transparent manner, without modification of the source code, in the OSI/CO network. For this application APP, everything happens as if it were continuing dialog through the TCP/IP protocol.

In FIG. 2, in a notable manner, the automatic address conversion wrapper W is constituted principally by a first submodule LIB forming the main library and containing a mapping table MT between the TCP/IP communication functions and the conversion functions included in the input interface IW of the wrapper W, a second service submodule AM for converting IP and OSI addresses, a third submodule SBT for recording connection information and managing said information by means of a binary searching tree, and a fourth service submodule KE for processing a specific set of extensions to the system.

The first submodule LIB then includes the table or plan of correspondence MT between the communications functions used in a TCP/IP network and the conversion functions integrated in an input interface IW of the wrapper W. The mapping table MT advantageously furnishes a bijective correspondence, such that for any TCP/IP communications function by way of the "sockets" mechanism (described in "UNIX Networking Programming", by Richard W. Stevens, published by Prentice-Hall) there is one and only one function in the interface IW that executes the service (or request) demanded by the application APP, and the name of the calls, the number of parameter arguments of a call, the semantics, and the chaining together of the calls are preserved exactly.

Preferably, the second service submodule AM for converting addresses also forms a library and performs the conversion between on the one hand the IP addresses including the network address of the machine in question and the port relating to the service accessed, and on the other the OSI addresses including the network service access point NSAP and the transport selector TSEL, said conversion being capable of being done in both directions, either IP addresses to OSI addresses, or OSI addresses to IP addresses.

Also in a preferred manner, the third submodule SBT for recording connection information managed by a binary searching tree furnishes an independent service (available in the form of a black box in the form of a library enabling optimal recording, sorting, searching and deletion of all the significant information elements relating to a given connection.

Finally, the fourth service submodule makes it possible to process a specific set of extensions to the system for redirecting and returning telecommunications calls not intended for the TCP/IP network, and accordingly not converted by the conversion module, to the standard library TCP, in the context of the "sockets" mechanism and by way of the system core.

This fourth submodule allows the most perfect possible portability of the application APP. In fact, when calls not intended for the TCP/IP network are detected that do not correspond to the type SOCK_STREAM and the family AF_INET, they need not be processed and hence converted by the wrapper W, and they are redirected to the system by way of extensions to the core of the system that enable calling back the standard library TCP.

The general mechanism is as follows. The application APP transmits a call to the wrapper W each time one of the following function calls is started:

"socket" which creates a connection end for a communication;

"bind", which assigns a name to reference the connection end of the communication;

"setsockopt/getsockopt", which selects/reads options at one connection end of the communication;

"getsockname", which reads the current address for one connection end specified;

"listen", which specifies the number of possible simultaneous incoming connections;

"connect", which issues a request for a connection to one local connection end;

"accept", which waits for and accepts an incoming connection;

"send" which transmits a message between connection ends at the same level;

"recv" which reads a message transmitted from a remote connection end to a local connection end;

"shutdown", which partially closes a bidirectional connection (full duplex).

However, as there is no bijection between the "socket" interface calls and the XTI interface functions, some means must be found for making them correspond. To do so, four communications phases are traversed. A first phase of initialization/"deinitialization" of the connection ends for communication, a second phase for establishing the connection, a third phase for transmitting data, and a fourth phase for disconnection.

Figure 3A:
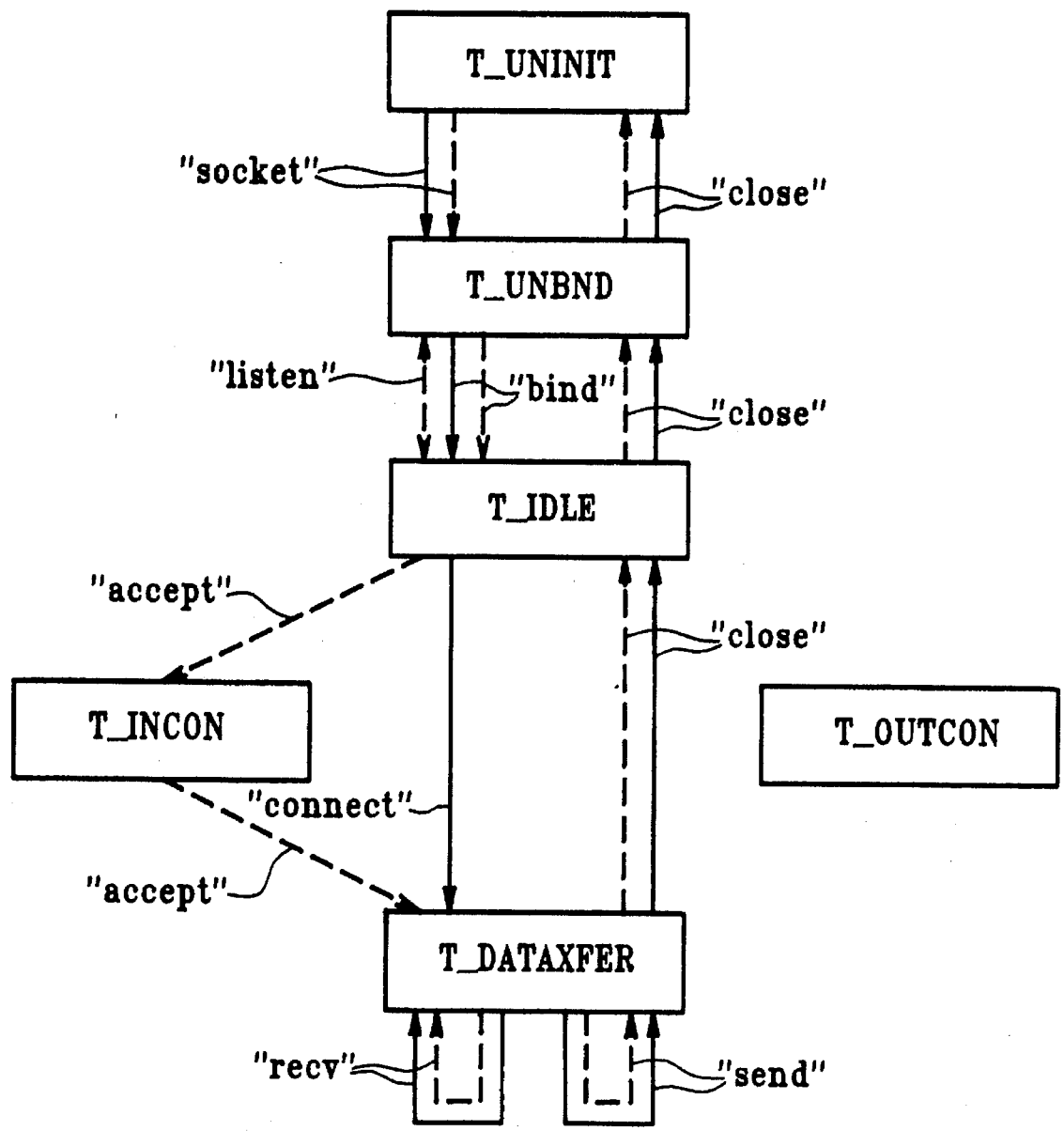
FIG. 3 shows an example of a sequence of transport functions in the connection-oriented mode, which are used on the one hand in FIG. 3a at the "socket" interface and on the other in FIG. 3b at the "XTI" interface.
Figure 3B:
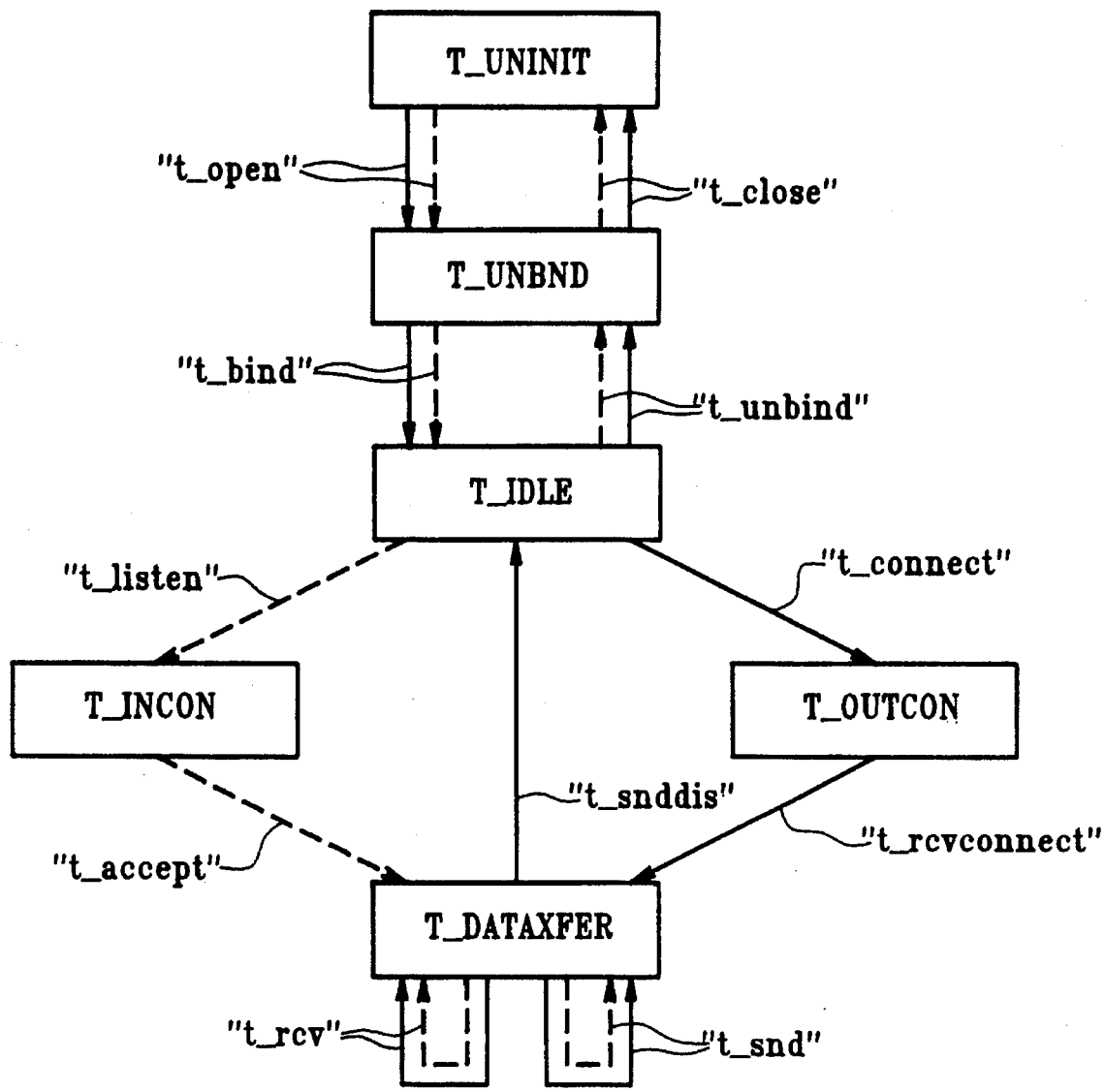

FIG. 3 proposes an example of a transport function sequence in the connection-oriented mode, used on the one hand in FIG. 3a in the "socket" interface and on the other in FIG. 3b at the XTI interface in such a way as to compare and specify the two mechanisms. The mechanisms are described and compared in parallel, function by function, in the aforementioned four communications phases.

In FIG. 3a, the arrows in solid lines represent a "client" process, while the arrows in dashed lines are for a "server" process.

In FIG. 3b, the arrows in solid lines represent a "active user" process, while the arrows in dashed lines are for a "passive user" process.

Figure 4:
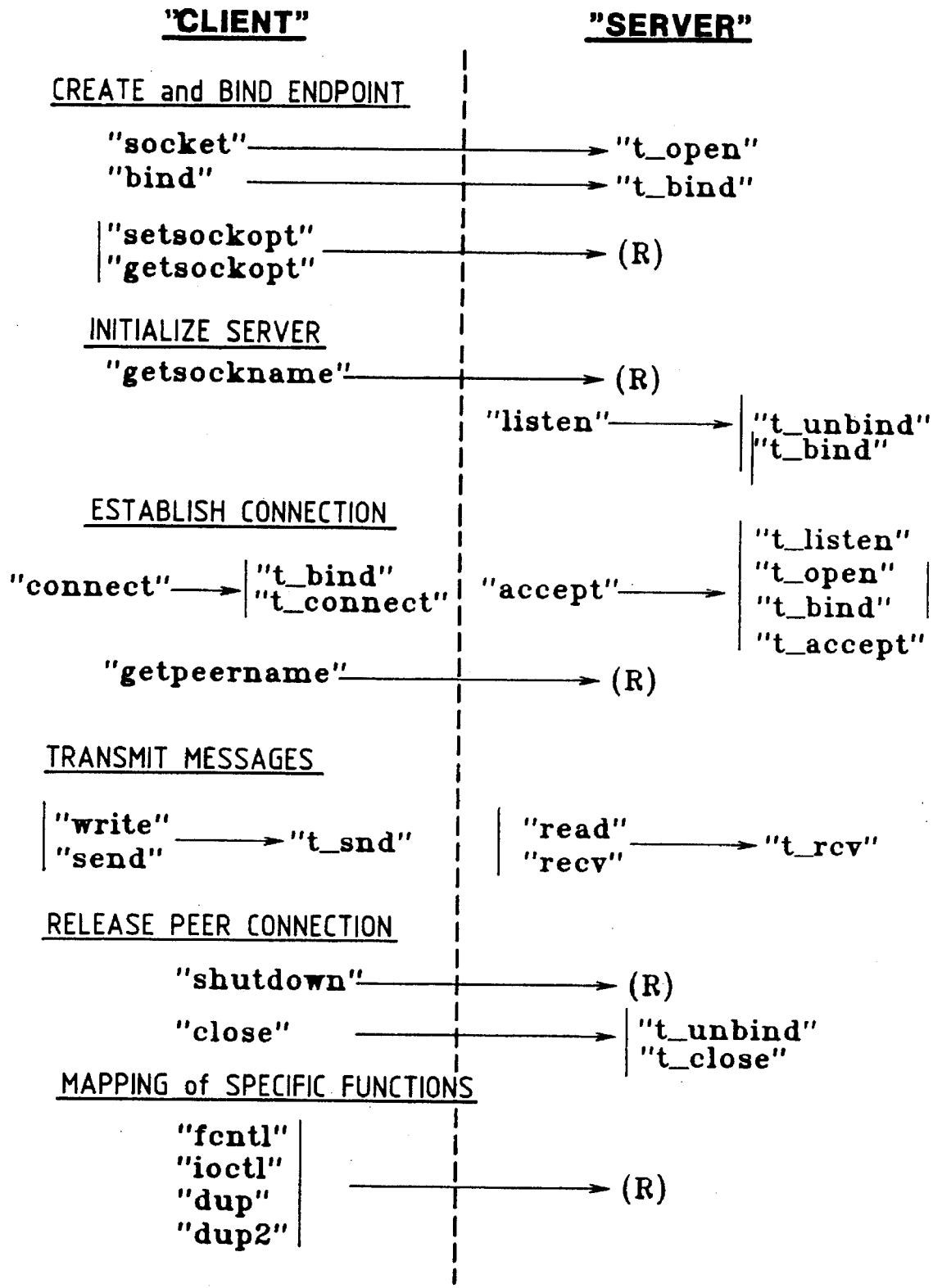
FIG. 4 shows a mapping table correspondence between the function calls of the "socket" interface and the "XTI" interface.

FIGS. 3a and 3b, for the sake of better comprehension, will be read together with FIG. 4, which shows a table of correspondence between the "socket" interface calls ("client" side) and the "XTI" interface ("server" side). When the "socket" interface calls have no correspondence with the "XTI" interface, specific interface routines are used, which are represented by the letter (R) in FIG. 4.

Hence at the very outset of the first phase of initialization/ "deinitialization", the uninitialized state is called T_UNINIT.

When a "socket" function call of the "socket" interface occurs, a connection end for the communication is created, while a transport identifier is furnished. To do so, the "socket" interface call (belonging to the AF_INET family) contains the specified domain (such as Internet), the specified type (for instance, SOCK_STREAM), and the protocol specified (such as TCP). The return values of the "socket" call are either an integer equivalent to the file descriptor, or (−1) when an error is found.

The corresponding function in the XTI-CO mode is "t_open"; it makes it possible to establish a connection end on the one hand by furnishing a transport identifier, which indicates a particular transport protocol, and on the other by returning a file descriptor that identifies a connection end. This is the first step in initializing a transport endpoint (from state T_UNINIT to the state T_UNBND, with a connection end not attached to an address). This function contains the specified name, a specified flag, and the structure of the invention furnished. The return values are either the file descriptor in question, or in case of error the value (−1).

The file descriptor returned by the function "t_open" will be used for any subsequent call to identify this particular local connection end. Also, so as to follow the connection end for communication through the sequence of transport function calls, each file descriptor created will be stored in a binary searching tree. This structure will also contain other information, such as the address of the network, the number of the port TCP which identifies the service requested, and any other information element needed.

A "bind" function call makes it possible to associate a "socket" call with an assigned address, by connecting an address to the transport endpoint. The "bind" (belonging to the AF_INET family) contains the return of the "socket" call specified (domain, type, protocol), the name of the address specified, and the size of the address. The return values of the "bind" call are either (0) if the call was successful, or (−1) in the case of error.

The corresponding function in the XTI-CO mode is "t_bind". This is the second step in the initialization of the transport endpoint (from the state T_UNBND to the state T_IDLE, a non-connected state but one already attached to an address). It enables on the one hand associated a protocol address with the transport endpoint specified by the file descriptor, and on the other activating this transport endpoint. It contains the transport endpoint specified (file descriptor), and the protocol address specified. The return values are either (0) if the call was successful or (−1) in the case of error.

A function call "setsockopt" enables selecting options for the "socket" call by managing the options for a transport endpoint. The call "setsockopt" (belonging to the family AF_INET) contains the return of the specified "socket" call (domain, type, protocol), the level specified, the name of the option specified, the access value of the option, and the size of the option. The return values of the "setsockopt" call are either (0) if the call was successful or (−1) in the case of error.

Each option is emulated independently of the others when this emulation is possible. Various options may be of the selected type, the main ones relating for example to the following:

debugging (SO_DEBUG), keeping active (SO_KEEPALIVE), the re-use of an address (SO_REUSEADDR), deferred closure if the data are waiting to be sent (SO_LINGER), the recording to the size required for the receive buffer (SO-RCVBUF), the recording to the size required for the sending buffer (SO-SNDBUF), the reception of express data in the normal data stream (SO_OOBINLINE).

Any other option may naturally be selected.

A "getsockopt" function call enables access to the options for the "socket" call and enables retrieving the selected options for a given connection end. The call "getsockopt" (belonging to the family AF_INET) contains the return of the specified "socket" call (domain, type, protocol), the level specified, the name of the option specified, the access value of the option, and the size of the option. The return values of the "getsockopt" call are either (0) if the call was successful or (−1) in the case of error.

To emulate reading of "socket" call options, a search is made for the file descriptor specific to this "socket" call by using the binary searching tree. Then the options specified or extracted from the information structure designated by the number of the file descriptor of the "socket" call.

A "getsockname" function call enables access to the current name of a "socket" call and enables retrieving the network service access point (NSAP) for a given transport connection end and the transport selector (TSEL). The call "getsockname" (belonging to the family AF_INET) contains the return of the specified "socket" call (domain, type, protocol), the name of the call specified, and the size of the specified call name. The return values of the "getsockname" call are either (0) if the call was successful or (−1) in the case of error.

A structured table, organized in the form of a binary searching tree, is consulted to extract the Internet address and the INET port corresponding to the descriptor indicated. The number of the port and the Internet address are always returned.

A "listen" function call, enabling a "server" to specify the number of possible simultaneous incoming connections at a predetermined input, where the "server" signifies its acceptance of requests for incoming connections at a given transport endpoint (by specifying the limits regarding the queue for the connection waiting to be accepted). The "listen" call (belonging to the family AF_INET) contains the return of the "socket" call specified (domain, type, protocol) and the size of the queue specified (the maximum length of this queue of connections waiting to be accepted). It should be noted that the inputs (or ports) of the "socket" interface that are connected will be automatically connected by the system. In that case, the name and number of the port can be retrieved by using the "getsockname" function. The return values of the "listen" call are either (0) if the call was successful or (−1) in the case of error.

The functions corresponding to the "listen" function in the XTI-CO mode are "t_unbind" and "t_bind". The "t_unbind" function is executed first; this is the third step in initializing a transport endpoint (from the state T_IDLE to the state T_UNBND). The function "t_unbind" enables deactivating the transport endpoint that had been connected previously by way of the "t_bind" function. It contains the transport endpoint specified (file descriptor). The return values are either the value (0) if the call was successful or the value (−1) in the case of error.

If the file descriptor is not found in the searching tree, the call is redirected to the standard library TCP. Otherwise, on principle, the transport endpoint is systematically unbound, in such a way as to take into account the maximum number of authorized connections that are waiting. However, it may happen that the transport endpoint has no bound address, and in that case this endpoint is left unbound.

Furthermore, a new link must be made by taking into account the number of connections requested by the "server" (the maximum number of connections is negotiated, taking into account the number of connection that can possibly be supported).

To summarize this initialization/"deinitialization" phase, the creation is done by means of the "socket" function, the link with an address is made by means of the "bind" function, and the selection of the maximum number of simultaneous incoming connections ("server") is made by means of the "listen" function.

In the second phase or connection establishment phase, the "connect" function call is used to obtain a connection from the "server", enabling a user of the transport to demand a connection at a predetermined transport endpoint. The "connect" call (belonging to the AF_INET family) contains the return of the specified local "socket" call (domain, type, protocol), the name of the address specified, and the size of the address specified. As for the "listen" function call the system automatically selects and connects the local address to the port in question if the port is not connected (the address remains connected regardless of what happens). The return values of the "connect" function are either the value (0) if the call was successful or the value (−1) in the case of error.

The functions corresponding to the "connect" function in the XTI-CO mode are "t_bind" and "t_connect". The "t_bind" function is executed first; this is the third step in initializing a transport connection and (from the state T_UNBND to the state T_IDLE). The function "t_bind" enables connecting an address to a file descriptor if that is found to be not connected. It contains the transport connection end specified (file descriptor), and protocol address specified. The return values are either the value (0) if the call was successful or the value (−1) in the case of error.

The function "t_connect" is then executed, which is the second step of establishing the connection of a transport endpoint (from the T_IDLE state to the T_OUTCON state (in the outgoing connection phase) or to the state T_DATAXFER (in the connected mode, data transfer) if the mode is synchronous). The "t_connect" enables demanding a connection to a distant transport endpoint. It contains the transport endpoint specified (file descriptor for opening a local transport endpoint where the communication will be established), the protocol address specified (to indicate the information required to establish the connection and the information that is associated with the new connection to be made). The return values are either the value (0) if the call was successful or the value (−1) in the case of error. It should be noted that in the present case, the user can define various options; he can also choose not to negotiate the options, by selecting an option side equal to zero.

If the file descriptor of the "client" is not found in the binary searching tree, the call is redirected to the core. The other errors are processed using a method of error recognition that verifies the validity of each argument (type, value, etc.), with the specific errors being managed by this function in the XTI-CO mode.

Next, the connection state is automatically verified by the "XTI" interface at the time of a "t_connect" function call. The state T_IDLE is formally required; any other state leads to the emission of an error, indicating that the function was sent during an erroneous sequence.

The information used to specify a call emission parameter are retrieved directly from the name and size of the name of the "connect" function call. In particular, the name contains the port of the distant service and the address of the distant host (the file descriptor is the only local reference).

The address format of the "socket" interface is converted into an address required by the XTI interface. In all cases where this is necessary, the local network service access point (local NSAP) will be retrieved by consulting the corresponding address of the machine of the OSI network, in the address conversion file. The address of the OSI protocol will be generated by concatenating the address of the distant host and the distant selector, depending on the OSI structure of the addresses required by the XTI interface. Access exists to the distant address, which has been linked to the distant transport endpoint, by the "server". The protocol address which is associated with the transport endpoint of the passive user is returned. In addition, if the value of the remote transport selector used by the server to complete the connection is different from the value required by the client, an error is raised.

At this stage, or in other words at the moment when the "server" accepts the connection request, no data has yet been received.

An "accept" function call is used by the "server" in order to wait for and accept a connection from a "client" at a "socket" interface input that is tagged as waiting to be received. The "server" extracts the first connection from the queue and creates a new "socket" input (if the length of the queue is greater than 1); the call is blocked until the connection is made, at least until this call is tagged as non-blocking. The "accept" call (belonging to the AF_INET family) contains the return of the local "socket" calls specified (domain, type, protocol), the name of the address specified (the address argument is a return parameter which is filled with the address of the "client", entity being connected), and the size of the address specified. It should be noted that the sequence of arguments is identical to those of the "bind", "getsockname", and "connect" calls, but the address argument is an output argument. Furthermore, if there is no waiting connection present in the queue and the call is tagged as blocking, the "accept" call blocks the requester until a connection is present. If the call is tagged as non-blocking and no connection is present in the queue, then the "accept" call returns an error. The return values, if the call was successful, are the address of the client, the actual size of the address returned, with the same "socket" argument properties including the ports connected and the file descriptor of a new "socket" input; if not, the return value is (−1) in the case of error.

The functions corresponding to the "accept" function in the XTI-CO mode are "t_listen", "t_open", "t_bind", and "t_accept". The function "t_listen" is executed first, which corresponds to the step of the passage from the state T_IDLE to the state T_INCON (waiting for input connection). The function "t_listen" enables listening with a view to accepting a connection request coming from a transport user. It contains the transport endpoint specified (file descriptor) identifying the distant transport endpoint where the connection indications sent by the active user arrive. It also contains the protocol address specified for recovering the information which is associated with the newly made connection. The maximum size of the address, options and data must be selected before sending the "t_listen" call to indicate the maximum size of each buffer. The return values are either the value (0) if the call was successful or the value (−1) in the case of error. It should be noted that the user can put a plurality of connection indications in the waiting state before responding to one of them.

The function "t_open" is executed next in the case of the passage from the state T_UNINIT to the state T_UNBND to create a new communications file descriptor.

The function "t_bind" is then executed, to reference the address of the new communications file descriptor at the time of the passage from the state T_UNBND to the state T_IDLE (with the same protocol address and with a 0 queue length).

The function "t_accept" is finally executed; this is the last step in the phase of making the connection (from the state T_INCON to the state T_DATAXFER). The function "t_accept" is sent by a passive transport user to accept a connection request from an identified active user. It contains the transport endpoint of the service specified (file descriptor of the "server"), which identifies the distant transport endpoint, or the connection indications are sampled by the passive user. It also contains the new communications file descriptor, which specifies the different local transport endpoint where the data transfer is to be done. Finally, it contains the protocol address specified in order to specify the information requested by the transport provider to achieve the newly made connection. The return values are either the value (0) if the call was successful or the value (−1) in the case of error.

Regardless of the usual procedure relating to the verification of the file descriptor, before generating a "t_listen" is generated, the connection state of the "server" file descriptor is verified. The state T_IDLE is then absolutely required; otherwise an error appears indicating that the function was sent during an erroneous sequence.

Before a "t_accept" event is generated, the connection state of the local end is not verified.

In the case of a connection end on the "server" side, the function "t_accept" cannot succeed and requires the value ((−1), error) when there are indications (of connection or disconnection) waiting to be received at this particular connection end.

In response to a "t_accept" call, since the argument address is a parameter resulting from the "t_accept" call, it is filled with the address of the distant entity to be connected. Next, this address is associated with the file descriptor. In the same way, the size of the address is also a parameter resulting from the "t_accept" call, and the latter initially contains the size of the space designated by the address, but in response to the "t_accept" call it will contain the actual size of the address returned.

Finally, following the "accept" function call, a new communications file descriptor is returned, which corresponds to the new "socket" input available.

A "getpeername" function call is used when the "client" or "server" wishes to know the name of the communications entity on the same level, with the active or passive user desiring to obtain the name of the distant connection end to which it is connected. The "getpeername" call (belonging to the AF_INET family) contains the return of the local "socket" call specified (domain, type, protocol), the address specified (the argument address being a resultant parameter which is given with the address of the entity at the same level being connected), and the size of the specified address. It should be noted that the sequence of arguments is identical to those of the "bind", "getsockname", "connect" and "accept" functions, but that the address argument is an output argument. The return values are either the address of the client, the actual size of the address returned and the value (0) if the call was successful or the value (−1) in the case of error.

In fact, the exchange of the name of the address is done when the passive user accepts ("accept" function) the connection request ("connect" function) from the entity on the same level. This address is then decoded. The name of the entity being connected, thus converted, is kept in the list of file descriptors in the binary searching tree, where it is associated with the new file descriptor that has been created for the communication. In this way, the passive user can always know the entity at the same distant level (the information is simply read).

To summarize the above phases, the creation is done by means of the "socket" function, the linking to an address is done by means of the "bind" function, and the connection is requested by way of the "connection" function and accepted by way of the "accept" function.

In the third phase or data transmission phase, the "send" function call is used to transmit data along a virtual channel through the ports of the "socket" interface that are connected, thus authorizing the user of the transport to send a stream of normal data or a stream of express data through the connection made. The "send" function can be used only when the port in question of the "socket" interface is effectively connected. The "send" call (belonging to the AF_INET family) contains the return of the local "socket" call specified (domain, type, protocol), the message specified (one unit of characters being defined as a string), the specified size of the unit of data to be transmitted, and the flags specified (a flag being a parameter that indicates a special command relating to transmission of the message, for example for sending data off-band, or data sent without a routing table, etc.).

It should be noted that if no space is available in the "socket" interface buffers in order to keep the message to be transmitted, then the transmission is blocked at least until the "socket" interface has been put in a non-blocking input/output mode. Next, it can be determined when the data can be sent anew.

The return values of the "send" function are either the number of characters sent if the call was successful, or the value (−1) in the case of error.

The corresponding function in the XTI-CO mode is "t_snd"; this is the state T_DATAXFER which persists until a disconnect request is sent by an active user or received by a passive user. It enables sending a stream of normal data or a stream of express data through a connection. It contains the transport endpoint specified (file descriptor) identifying the local transport endpoint from which the data are sent, the specified data buffer (data unit defined as a pointer of a string), the size of the buffer specified (the number of eight-bit bytes of user data to be sent), and the specified flags (including any option). It should be noted that a flag selecting the express data stream signifies that the data are sent at this speed, and interpretation is done by the transport provider. A flag can likewise indicate that the data units are sent by way of a sequence of multiple "t_snd" calls. The end of the data is identified by the "t_snd" call with this same last flag not selected. This enables a user to break down large logical data units. The return values are either the number of eight-bit bytes accepted by the transport provider if the call was successful, or the value (−1) in the case of error (indicating the impossibility of transmitting the data).

In the event that the file descriptor of the user is not found in the binary searching tree, the call is redirected to the standard library TCP.

The connection state of the file descriptor is verified. The state T_DATAXFER is absolutely required; any other state leads to the emission of an error, indicating that the function was sent during an erroneous sequence.

Normally, the number of bytes send is equal to the number of bytes specified in the specified size. However, if the non-blocking input/output mode is selected, then it is possible for only some of the data to be actually accepted by the transport provider. In that case, the "t_snd" call returns a value indicating a number of bytes less than the specified size.

The "recv" function call is used to gather the data arriving at the connected ports of the "socket" interface over a virtual channel, allowing a transport user to receive a data stream sent at normal speed or express at the same connection. The "recv" call cannot be used unless the involved ports of the "socket" interface are connected. The "recv" call (belonging to the AF_INET family) contains the return of the local "socket" call (domain, type, protocol), the address of the buffer specified where the data are to be placed, the size of the data reception buffer (if a message is too long to be held in the given buffer, then the excess bytes can be deleted, depending on the type of port of the "socket" interface where the message originated), and the specified flags (parameters indicating a special command relating to transmission of the message, the same parameters as those present with the "send" call). The same arguments are used with the "send" and "recv" calls. The flag argument in a "recv" call is formed by the logical combination of one or more values. It should be noted that if no message is available at a port of the "socket" interface, then the "recv" call waits for a message to arrive, at least until the "socket" interface has been placed in the non-blocking mode, in which case a value (−1) is returned. The return values of the "recv" call are either the number of bytes received if the call was successful, or the value (−1) in the case of error.

The corresponding function in the XTI-CO mode is "t_rcv". The situation is the same as with the "t_snd" call; the state T_DATAXFER persists until a disconnect request has been sent by an active user or received by a passive user. It enables receiving at the same connection a stream of normal data or a stream of express data. It contains the transport endpoint specified (file descriptor) identifying the local transport endpoint by which the data arrive, the reception buffer specified where the user data are received, and the size of the reception buffer (number of bytes). The return values are either the values selecting the flags and specifying the optional flags, as well as the number of bytes received by the transport provider, if the call was successful, or the value (−1) in the case of error.

If the file descriptor is not found in the binary searching tree, the call is redirected to the standard library TCP.

The connection state of the file descriptor is verified. The state T_DATAXFER is absolutely required; any other state leads to the emission of an error, indicating that the function was sent during an erroneous sequence.

In response to the "t_rcv" call, if a flag indicating that other data are to be received is selected, the current transport service data units sent in the normal data stream or the express data stream (depending on a second flag selected) must be received by means of multiple "t_rcv" calls. Each "t_rcv" call, with the flag selected, indicates that another "t_rcv" call follows immediately to furnish the new data for the current data unit, and this is done as many times as necessary to receive all the data. The end of this data unit is identified by the return of the "t_rcv" call when the flag is no longer selected.

If an express data stream (selection of the flag intended for that purpose) arrives after part of a normal data stream has been received, the remaining part of this normal data stream will not be received as long as the entire express data stream has not been processed.

The system call of standard functions "read" or "write" furnishes another means of sending or receiving a stream of normal data or a stream of express data to a given connection. The "read" or "write" calls contain the file descriptor specified (which is open and refers to a data stream (STREAM)), the buffer specified, and the size of the buffer specified.

The corresponding functions in the XTI-CO mode are, respectively, "t_snd" and "t_rcv", as described above With an entity of the same level at each end of the connection, a user can send or receive data without specifying the entity of the same level. Thanks to this feature, the "write" or "read" standard calls can be used without inconvenience.

It should be noted that the same correspondence exists between "read" and "t_rcv" as between "recv" and "t_rcv", and the same correspondence exists between "write" and "t_snd" as between "send" and "t_snd". Consequently, a standard "read" call can be executed when the file descriptor does not appear in the list of file descriptors managed in the binary searching tree. On the other hand, the arguments relating to the flags are of no use and are always forced to the value 0.

The return values for the "read" call are the number of bytes received and for the "write" call are the number of characters sent, when these calls were successful, and the value (−1) in the case of error.

In the fourth or "disconnection" phase, the standard function system call "shutdown" is used to cause the sending and/or receiving of data through a virtual channel to stop; the transport user is thus allowed to interrupt the data transmission to a connection. The "shutdown" function cannot be used unless the port in question of the "socket" interface is effectively connected. This function accordingly brings about the total or partial closure of a bilateral and "full duplex" connection between the port of the "socket" interface in question and the associated termination of this connection. The "shutdown" call (belonging to the AF_INET family) contains the return of the local "socket" call specified (domain, type, protocol) and the specified direction of data circulation, and an argument of value 0 signifies that the reception is interrupted, while an argument of value 1 signifies that the transmission is interrupted and an argument of value 2 signifies that the transmission and reception are interrupted. The return values of the "shutdown" call are either the value 0 if the call was successful or the value (−1) in the case of error.

When the "shutdown" function is executed at a port of the "socket" interface, all the data that are waiting are immediately deleted. Hence generally the user who does not use the waiting data can execute a "shutdown" call at a predetermined port of the "socket" interface before closing it.

If the file descriptor of the user is not found in the binary searching tree, the call is processed by the call of the standard "shutdown" function, whose return value is returned directly to the user of the call.

The connection state of the file descriptor is then verified. The state T_DATAXFER is absolutely required. Any other state causes the appearance of an error, indicating that the function was sent during an erroneous sequence.

No delete function whatever exists in the XTI interface; hence the arriving or departing data in the buffers cannot be deleted. However, outside the XTI interface (that is, in STREAM), it is possible to read and delete the data present in the reading buffer.

The standard function system call "close" is used for a disconnect of a virtual channel, thus enabling a transport user to free up the connection in question. The standard "close" call can also be used for a "socket" interface file descriptor. The rule is that the "close" call erases the file descriptor concerned from the table of process object references, and when it is the last reference to the predetermined object, then that object is deactivated. The final "close" call at a "socket" interface port requires that the information associated and the data waiting be deleted. The "close" call contains the return of the local "socket" call specified (domain, type, protocol). The return values are either the value (0) if the call was successful or the value (−1) in the case of error.

The corresponding function in the XTI-XO mode is "t_close"; it can be started in any state whatever, except for the state T_UNINIT, and a disconnect command is then sent by the active user or received by the passive user. The transport provider is informed that the user is no longer using the transport endpoint specified by the file descriptor. In addition, the file associated with the transport endpoint is closed. The function "t_close" contains the transport endpoint specified (file descriptor identifying the local transport endpoint through which the data circulate). The return values are either the value (0) if the call was successful or the value (−1) in the case of error.

A standard "close" system call is effectively executed when the file descriptor no longer appears in the list managed in the binary search tree.

The function "t_close" must be called from the state T_UNBND, but since this function does not verify the state information, it can accordingly be called from any state, to close a transport endpoint. Hence in the state T_UNBND, the "t_close" is normally executed; in the states T_IDLE, T_INCON or T-OUTCON, it is the calls "t_unbind" and "t_close" that are executed, and in the state T_DATAXFER, a "t_snddis" or "t_rcvdis" ("t_snddis" is a request for disconnection and the call is sent by the active user; "t_rcvdis" is a search for the cause of the disconnection, and the call is sent by the passive user) is executed in a first time period, and then only the "t_unbind" and "t_close" calls are executed.

Finally, if no other process makes reference to the file descriptors of the transport endpoint (all the file descriptors associated with the file that has been closed), then:

all the file descriptors associated with the connection end in question are automatically freed up;

any transport connection which could be linked with this connection end is interrupted;

a passage is made from the state that was obligatorily different from the state T_UNINIT to the state T_UNINIT, and hence a return to any beginning of the process.

Other standard function system calls may also be used. Hence it is possible to control the inputs/outputs of the "socket" interface by means of "ioctl" and "fcntl" function calls. These calls can be dedicated specifically to controlling the operations at the "socket" interface, since an application uses such a call only once a file descriptor has been assigned to one input of the "socket" interface. In that case, this call contains the return of the local "socket" call specified (domain, type, protocol), the command specified in the form of a code that enables selection of the control function to be executed, and finally, the argument specified, which represents the additional information necessary for interpreting certain values of the code of the specified command.

The command specified may depending on the code, and in a non-limiting fashion, enable the following:

knowing the identity of the process group that contains the current process (SIOCGPGRP);

asking whether the emission of a asynchronous signal is done for a process or a process group (SIOCSPGRP);

assuring that the reading pointer of a "socket" input is or is not currently positioned in the data stream in the region where the off-band data are received (SIOCATMARK);

returning the number of bytes waiting to be read at a "socket" input (FIONREAD);

switching the "socket" input in an input/output mode for either blocking or non-blocking (FIONBIO).

The general "ioctl" calls, which enable controlling operations relating to files, can also be used to control the "socket" interface. The arguments are identical to those described above as to the return of the local "socket" call specified and the argument specified, but different as to the command specified. Thus in this case, the code can enable selecting the command function that is to be executed relative to a file or a file descriptor:

closure of the "socket" inputs when a new code is loaded for the process;

positioning or cancellation of the asynchronous input/output mode.

The "ioctl" calls can also be used to control the use of the network communication interfaces ("ifnet"). These calls enable searching for and retrieving interfaces from their addresses, or retrieving an interface in a given network. The arguments are identical to those described above, except as to the structure of the request on the one hand, which uses parameter definitions, and on the other the command specified for the function to be executed in the given interface to obtain the "ifnet" address (interface address), the general diffusion address ("broadcast"), the "ifnet" list (used to retrieve the interface configuration), addresses between entities at the same level (to a distant machine with which a link is established), or "ifnet" flags (most often, the network interface can be identified as connected or not connected, operational, or attached to a general diffusion address), for example.

Converting the above functions can be done with the aid of the "ioctl" function in the data streams (the XTI interface being employed by means of data streams: STREAMS). In this case, the "ioctl" function contains the specified file descriptor (open file which refers to a data stream), the specified command (determining the control function to be executed), and the specified argument (representing the additional information necessary for certain values of the code, which in general is an integer or a pointer to a data structure for a specific command). More particularly, the specified command may, in a non-limiting manner, enable the following:

transmitting to the header of the data stream the information expressing the fact that the user wishes the core of the system to send a signal (I_SETSIG) when a particular event appears in this data stream associated with the file descriptors (referring to this data stream);

returning the information about the events for which the call process has requested sending of the signal SIGPOLL (I_GETSIG);

counting the number of bytes in the data blocks of the first message in the queue at the beginning of the data stream (I_NREAD).

The conversion of the above functions can be done with the aid of the "fcntl" function for the data streams. The "fcntl" function contains the specified file descriptor (open file which can make reference to the data stream), the command specified (determining the control function to be executed), and the specified argument. The specified command may for example be used to do the following:

to position or read the position of the closure flag of the files following a new startup of a process (F_SETFD, F_GETFD);

to return the value of the various state flags that define the synchronous mode (O_SYNC), asynchronous mode (FASYNC) and nonblocking mode (O_NDELAY);

to ask whether the emission of a asynchronous signal is done for a process or a process group (SIOCSPGRP);

to know the identity of the process group that contains the current process (SIOCGPGRP).

In general, controlling the inputs/outputs at the "socket" inputs can be emulated with the aid of control functions for the data streams (STREAMS).

The wrapper W can also process asynchronous inputs/outputs. To do so, a specified signal interrupts the module to indicate to it the arrival of asynchronous inputs/outputs, and in response to this signal a warning is sent by the module to the application. The asynchronous inputs/outputs can appear when various critical function calls are executed. The behavior relative to the function calls can be summarized as follows:

An asynchronous event occurs at a transport endpoint when a "connect" call is executed. A signal is received by the wrapper W, and a "t_rcvconnect" call (reception of the confirmation after execution of a "t_connect" call) can be used to determine the state of the connection request sent previously in the asynchronous mode. The connection is made as soon as the "t_rcvconnect" call is successful. In return, the call address structure contains the distant transport service access point (TSAP) that sent the call.

An asynchronous event occurs when an "accept" call is applied, at the moment when a first connection of the queue is extracted and a "socket" communications input is created. A signal is received by the wrapper W, and a "t_listen" call can be made. By default, this latter call is executed in the synchronous mode and waits for the arrival of an indication that a connection is made, before responding in return to the passive user. However, if the non-blocking mode has been selected by way of "t_open" or "fcntl" calls, then the "t_listen" call is executed asynchronously, being reduced to a scan of existing connection indications. if no connection is waiting, then an error (value (−1)) is returned. In the case of an asynchronous execution it is possible to use a sequence number (whose value enables unique identification of the connection indication returned), to wait for a plurality of multiple connection indications before responding to one of them.

An asynchronous event occurs when a "send" call is executed for sending a normal data stream or an express data stream to a connection. A signal is received by the wrapper W, and a "t_snd" call can be made. By default, it is executed in the synchronous mode and can furthermore wait for whether the data stream contains restrictions temporarily preventing the acceptance of data by the local transport provider at the moment the call is made. However, if the non-blocking mode has been selected by way of the "t_open" or "fcntl" calls, then the "t_snd" call is executed asynchronously. In the case of a data stream control restriction, the call fails, but the process can be informed of this by means of a signal, and when these restrictions disappear, the data streams (normal or express) can be present.

An asynchronous event occurs when a "recv" call is executed for the reception of (normal or express) data streams at a connection. A signal is received by the wrapper W, and a call "t_rcv" can be made. By default, this latter is executed in the synchronous mode and waits for the arrival of data if none are available at the moment. However, if the non-blocking mode has been selected by way of the "t_open" or "fcntl" calls, then the "t_rcv" call is executed in the asynchronous mode; in the absence of data, it fails unless the user can be informed of the arrival of data streams (normal or express) after studying the signals tasked with warning him of this.

Duplication functions can also be used. In fact, the majority of TCP/IP applications require the duplication of an open file descriptor. In this case, the wrapper W receives a "dup" (duplication) system call and converts it into a "fcntl" call, which contains the file descriptor specified, the command to duplicate the file descriptor, and the argument specified. In response to the duplication command, a new file descriptor is normally returned. In that case, the new file:

is the smallest available file descriptor greater than or equal to the argument specified;

refers to the same object as the original file descriptor;

shares the same file pointer;

shares the same access mode;

shares the same file descriptor state flags;

possesses a specific flag selected in such a way as to leave the file open following the creation of a new process.

In response to the duplication command, an error can also be returned if:

the maximum number of file descriptors authorized is reached, or the argument specified is negative or greater than the maximum number authorized of file descriptor per process.

The wrapper W can also receive a "dup2" system call and convert it into a "fcntl" call, which contains the file descriptor specified, the command to duplicate the file descriptor, and a second duplicated file descriptor. In that case, the fact that the second file is closed is first verified, and if it is not, then that file is closed.

The wrapper W periodically updates the binary search tree with the various file descriptors. In this tree, it creates at least one new descriptor reference for consulting the information on the original file. It accordingly shares the same information (used in common) as that for the original file descriptor. If necessary, a chained list is then created, linking the duplicated file descriptors.

In conclusion, the address conversion process according to the invention makes it possible to furnish to any application communicating within the Internet domain (with TCP/IP protocols) the possibility of dialog through OSI communications layers, and of thus being used directly in an OSI/CO network (without any other communications protocol), while proceeding as if this application were continuing dialog through the TCP/IP protocol, since the access to the OSI layers is transparent. The broadcasting of the messages through the OSI layers is obtained without any modification of the source code of the application (particularly, without any modification of the programs used by the application for communication), nor any change whatever in behavior of the telecommunications calls employed in the applications. The address conversion is accordingly completely automatic as soon as a conversion module is added at the moment of the link editing phase (the final step in the production of the executable). This conversion module is in fact a library corresponding to a set of functions and is accordingly quite low in cost. Furthermore, this conversion module includes a service submodule enabling the processing of a specific set of extensions of the system, which makes it possible to assure perfect portability of the application.

We claim:

1. A process of address conversion for porting telecommunications applications from a TCP/IP network to an OSI-CO network, access to these networks being authorized by way of a socket interface for the TCP/IP network, and an XTI interface for the OSI-CO network, said process comprising:

trapping socket interface calls, and a plurality of system calls of a read, write, close type, in a first time period, at a moment of a link editing phase prior to obtaining an executable, in an automatic address conversion module of a library type;

converting, by said conversion module, addresses pertaining to the TCP/IP network into addresses of the OSI-CO network so as to enable passage from a TCP/IP protocol to an OSI-CO protocol;

transmitting the system calls to the XTI interface after conversion to be directly used in the OSI-CO network, wherein only the calls intended for the TCP/IP network are processed, and all other calls are returned to the networks.

2. The address conversion process of claim 1, wherein when the call of the socket interface is for the TCP/IP network, a specific resource is first created in a memory in order to preserve a trace of a connection, and the XTI interface is called for opening said connection, said connection being managed by means of a binary searching tree.

3. An address conversion module used in a process of address conversion for porting telecommunications applications from a TCP/IP network to an OSI-CO network wherein said module comprises:

a first submodule forming a main library and containing a mapping table between TCP/IP communication functions and conversion functions included in an input interface of a wrapper;

a second service Submodule for converting IP and OSI addresses;

a third submodule for recording connection information and managing said connection information by means of a binary searching tree; and a fourth service submodule for processing a specific set of extensions to the networks.

4. The address conversion module of claim 3, wherein the mapping table included in the first submodule furnishes a bijective correspondence, wherein, for any TCP/IP communication function authorized by a socket interface, there is one and only one function in the interface that executes the service demanded by the applications; and names of calls, a number of parameter arguments of a call, semantics, and chaining together of calls are preserved exactly.

5. The address conversion module of claim 4, wherein the second service submodule for converting addresses also forms a library and performs the conversion between addresses including the network address of a given machine and a port relating to a service accessed, and OSI addresses including a network service access point and a transport selector, said conversion being capable of being done in both directions, either IP addresses to OSI addresses, or OSI addresses to IP addresses.

6. The address conversion module of claim 5, wherein the third submodule for recording connection information managed by the binary searching tree provides an independent service comprising a library enabling optimal recording, sorting, searching and deletion of all significant information elements relating to a given connection.

7. The address conversion modeule of claim 6, wherein the fourth service submodule enables processing of a specific set of extensions to the networks for returning calls that are not intended for the TCP/IP network and accordingly are not converted by the conversion module, to a standard library in the socket interface.

* * * * *